US012715016B2

(12) United States Patent
Utting

(10) Patent No.: US 12,715,016 B2
(45) Date of Patent: Aug. 25, 2026

(54) TRANSPORTABLE MODULES AND/OR VEHICLE ENCLOSURES

(71) Applicant: David John Utting, Norwich (GB)

(72) Inventor: David John Utting, Norwich (GB)

( * ) Notice: Subject to any disclaimer, the term of this patent is extended or adjusted under 35 U.S.C. 154(b) by 463 days.

(21) Appl. No.: 18/245,699

(22) PCT Filed: Oct. 26, 2021

(86) PCT No.: PCT/GB2021/052782
§ 371 (c)(1),
(2) Date: Mar. 16, 2023

(87) PCT Pub. No.: WO2022/090707
PCT Pub. Date: May 5, 2022

(65) Prior Publication Data
US 2023/0356251 A1 Nov. 9, 2023

(30) Foreign Application Priority Data
Oct. 26, 2020 (GB) ..................................... 2016925

(51) Int. Cl.
*B05B 16/80* (2018.01)
*B05B 16/20* (2018.01)
(Continued)

(52) U.S. Cl.
CPC .............. *B05B 16/80* (2018.02); *B05B 16/20* (2018.02); *B05B 16/40* (2018.02); *B05B 16/60* (2018.02); *F26B 25/066* (2013.01)

(58) Field of Classification Search
CPC ......... B05B 16/80; B05B 16/20; B05B 16/40; B05B 16/60; F26B 25/066; B60S 3/002
See application file for complete search history.

(56) References Cited

U.S. PATENT DOCUMENTS 4,630,567 A * 12/1986 Bambousek ......... B25J 19/0025 118/DIG. 7
4,872,419 A * 10/1989 Blankemeyer .......... B05B 16/00 118/425
(Continued)

FOREIGN PATENT DOCUMENTS

DE 42 27 751 A1 2/1995
WO 2003/054327 A1 7/2003
WO 2014/016606 1/2014

OTHER PUBLICATIONS

International Search Report dated Feb. 11, 2022, issued in PCT Application No. PCT/GB2021/052782, filed Oct. 26, 2021.
(Continued)

*Primary Examiner* — Brent W Herring
(74) *Attorney, Agent, or Firm* — Workman Nydegger

(57) ABSTRACT

A transportable module which when deployed forms at least part of a vehicle enclosure, the transportable module includes a first housing which houses at least part of an air handling unit, the housing including a rigid side wall or a rigid roof portion which is extendible to form at least part of an additional housing adjacent to the air handling unit; the additional housing being suitable for housing and fully enclosing a vehicle; whereby spraying and baking operations may be carried out within the additional housing whilst the vehicle is shielded from the surrounding environmental conditions; the air handling unit being configured to heat and/or cool air in order to provide heated or cooled air to the vicinity of the vehicle; and an extraction duct for removing air from the additional housing and for filtering the removed air prior to disposing of it into the surrounding environment.

15 Claims, 13 Drawing Sheets

CROSS SECTION

(51) Int. Cl.

| | |
|---|---|
| ***B05B 16/40*** | (2018.01) |
| ***B05B 16/60*** | (2018.01) |
| ***F26B 25/06*** | (2006.01) |

(56) References Cited

U.S. PATENT DOCUMENTS

| | | | | |
|---|---|---|---|---|
| 4,932,354 | A * | 6/1990 | Kistner | B05B 14/30 135/900 |
| 4,981,318 | A * | 1/1991 | Doane | B60P 3/14 296/26.14 |
| 5,113,600 | A * | 5/1992 | Telchuk | B05B 16/20 34/90 |
| 5,395,285 | A * | 3/1995 | Milton | F24F 3/14 454/52 |
| 5,853,215 | A * | 12/1998 | Lowery | B60P 3/14 296/24.32 |
| 5,864,991 | A * | 2/1999 | Burns | B60P 3/14 296/26.1 |
| 6,132,509 | A * | 10/2000 | Kuschnereit | B01D 29/56 239/289 |
| 7,666,077 | B1 * | 2/2010 | Thelen | B05B 16/60 454/339 |
| 8,061,752 | B2 * | 11/2011 | Ohnstad | B62D 63/061 296/24.32 |
| 9,759,089 | B2 * | 9/2017 | Weber | B05B 16/80 |
| 10,124,376 | B2 * | 11/2018 | Zucchi | B08B 15/02 |
| 12,145,164 | B2 * | 11/2024 | Zimmerman | A62C 3/00 |
| 2007/0056510 | A1 * | 3/2007 | Antaya | B05B 16/80 118/309 |
| 2007/0090629 | A1 * | 4/2007 | Ohnstad | B62D 63/061 280/656 |
| 2009/0253360 | A1 * | 10/2009 | Tafoya | B08B 15/02 454/50 |
| 2022/0055578 | A1 * | 2/2022 | Fairbanks | B60S 3/002 |

OTHER PUBLICATIONS

Written Opinion dated Feb. 11, 2022, issued in PCT Application No. PCT/GB2021/052782, filed Oct. 26, 2021.

* cited by examiner

SIDE VIEW

TRANSPORTABLE MODULES AND/OR VEHICLE ENCLOSURES

FIELD OF THE INVENTION

The invention relates to transportable modules and/or vehicle enclosures suitable for spraying and baking vehicles.

BACKGROUND TO THE INVENTION AND PRIOR ART KNOWN TO THE APPLICANT

The closest prior art is the Applicant's own prior patent publication WO2014/016606 which discloses a transportable enclosure suitable for spraying and baking a vehicle. It teaches the use of a single module in which both the air handling unit and the vehicle receiving portion are provided. These vehicle enclosures may be rapidly configured for spraying and baking. They are particularly versatile and may be deployed in a wide variety of settings on a permanent or semi-permanent basis. They allow high quality spraying and baking to take place without requiring extensive infrastructure such as a vehicle hanger in which multiple spraying and baking stations may be provided. Neither the Applicant's own prior art nor the construction of large hangers are practical when spraying and baking large structures or vehicles such as trains. One of the objectives of certain embodiments of the invention is to provide a rapidly deployable structure which may be advantageously transported to a site and deployed as a station for treating large vehicles such as trains or the like.

SUMMARY OF THE INVENTION

In a first broad independent aspect, embodiments of the invention provide a transportable module which when deployed forms at least part of a vehicle enclosure, said transportable module comprising a first housing which houses at least part of an air handling unit, said housing comprising a rigid side wall or a rigid roof portion which is extendible to form at least part of an additional housing adjacent to said air handling unit; said additional housing being suitable for housing and fully enclosing a vehicle; whereby spraying and baking operations may be carried out within said additional housing whilst said vehicle is shielded from the surrounding environmental conditions; said air handling unit being configured to heat and/or cool air in order to provide heated or cooled air to the vicinity of said vehicle; and an extraction duct for removing air from said additional housing and for filtering said removed air prior to disposing of it into the surrounding environment. This configuration is particularly advantageous as it provides for particularly compact transportation of the enclosure and its efficient deployment on site.

In a further broad independent aspect, the invention provides a transportable module which when deployed forms at least part of a vehicle enclosure, said transportable module comprising a housing which houses at least part of an air handling unit, a side wall portion which is stackable adjacent to the housing during transportation and which is deployable to project upwards from the housing, a roof portion which is also stackable with respect to the housing during transportation and which is deployable to form a roof whilst resting on at least part of the side wall portion. This configuration is particularly advantageous because the module may be transported on roads by an appropriate vehicle transporter such as a truck or lorry. It also provides embodiments which are particularly stable in severe weather conditions whilst providing the protection sought after for spraying and baking operations. It allows in particular the shielding of much larger structures than the volume occupied during transportation.

In a subsidiary aspect, the side wall portion is stacked above the housing and is pivotally secured to the housing. This allows the module to be rapidly deployed and in certain embodiments double or more than double the height of the deployed structure.

In a subsidiary aspect, the roof portion is stacked above the side wall portion and is pivotally secured to the side wall portion. This allows the expansion of the module in more than one dimension which considerably increases the achievable volume for receiving a vehicle.

In a further subsidiary aspect, the module comprises an actuator for driving a deployment of the side wall portion. This configuration provides a much more efficient deployment of the module into a vehicle enclosure of the kind required.

In a further subsidiary aspect, the actuator comprises a hydraulic ram extending between the housing and the side wall which when activated causes the side wall portion to pivot from a position where the side wall portion lays substantially flat on top of the housing to an erect position where the side wall portion extends upwards from the housing. This configuration is particularly advantageous in increasing the achievable volume of the enclosure formed by modules of the kind in question.

In a further subsidiary aspect, the module comprises an actuator for driving the deployment of the roof portion. This configuration provides an advantageously rapid deployment and transition from the transportable module to the vehicle enclosure. This approach is also believed to increase the safety of the deployment operation.

In a subsidiary aspect, the actuator comprises a hydraulic ram extending between the side wall portion and the roof portion which when activated causes the roof to pivot from a position where it lies against the side wall portion to a position where it extends laterally therefrom. This provides an advantageous safe and rapid expansion of the achievable enclosure volume.

In a further subsidiary aspect, the side wall portion incorporates one or more air ducts through which air flows from the air handling unit to an inlet through which heated air enters a vehicle receiving portion when an enclosure is formed in part by the deployed module. This is particularly advantageous in order to provide advantageous airflow from an uppermost portion of the formed vehicle enclosure which will allow the air to be drawn over the entire height of the side of a train, should a train be positioned in the vehicle enclosure.

In a further subsidiary aspect, the housing comprises an extraction duct through which air in an enclosure formed in part by the deployed module may be drawn out of the vehicle receiving portion of the enclosure. This allows advantageous capture of air for removal from the vehicle enclosure.

In a further subsidiary aspect, the housing comprises a fan for driving the circulation of air through the air handling unit and a vehicle receiving portion when an enclosure is formed in part by the deployed module.

In a further subsidiary aspect, the housing comprises a burner for heating air at a first temperature level suitable for spraying paint onto a vehicle and at a second temperature level suitable for baking the paint. This configuration is particularly advantageous as it allows the formed enclosure to reach both spraying and baking appropriate temperatures.

In a further subsidiary aspect, the air handling unit comprises a heat exchanger for cooling air to a temperature suitable for spraying paint onto a vehicle.

In a further subsidiary aspect, the housing comprises a first wall located towards the front of the housing, a second wall located to one side of the housing, a third wall located towards the rear of the housing and a fourth wall located to one side of the housing; said deployable side wall portion being provided above the second side wall. This configuration provides a particularly robust structure from a load bearing perspective. Advantageously, the side wall portion may be in line with the second side wall in order to maximise its load bearing capabilities.

In a further subsidiary aspect, the air handling unit is adjacent to the second side wall. This is particularly advantageous as it provides spacing between the air handling unit and the first side wall which may be occupied by other kinds of equipment, for example a compressor system or a paint mixing room.

In a further subsidiary aspect, the module comprises a floor portion above which the air handling unit is provided; the floor portion being configured to carry the air handling unit. This configuration is particularly advantageous in terms of transporting the module as a single integrated piece.

In a subsidiary aspect, the housing comprises side walls, a roof and floor portions which each include a plurality of structural beams extending in respective orthogonal axes; the air handling unit being provided within the housing. In certain embodiments, this provides a particularly lightweight structure as the beams bear most of the stresses and strains associated with lifting the transportable module whilst additional side walls may be provided in certain embodiments to enclose the spaces between respective beams. These additional side walls may therefore only have a secondary load bearing function.

In a further subsidiary aspect, the housing comprises one or more separate rooms in addition to any room within which the air handling unit is located. This provides additional potentially segregated spaces for paint mixing rooms, an office, or a compressor system.

In a further subsidiary aspect, the module further comprises a deployable floor portion which during transportation may be positioned against the housing and which is deployable into a position where the floor portion extends laterally from the housing. This optional feature may be useful if the vehicles in question themselves are large trucks or lorries instead of trains, locomotives and/or their waggons which are potentially transported on their rails. Floor portions may be advantageous for capturing unused droplets of paint and other substances. For certain embodiments, the floor portion may also incorporate an air duct for extraction in a similar fashion as that described previously with respect to the deployable side wall.

In a further broad aspect, the invention provides a spraying and baking vehicle enclosure being formed by at least two deployed modules according to any of the preceding aspects, wherein respective roof portions of the deployed modules are secured to one another in order to form a vehicle receiving portion. This configuration is particularly advantageous as it allows with as little as only two modules the formation of a vehicle receiving portion, which is more than four times the volume of each module. This allows a vehicle enclosure to be deployed very rapidly at most sites of a rail network which may also contribute to a reduction in potential disruption of the downtime for a particular train in need of painting and/or refurbishing.

In a subsidiary aspect, the enclosure comprises a vehicle entrance formed between the deployed modules and one or more closure members capable of selectively closing the vehicle entrance. Optionally, the closure members may be part of a roller blind system. This provides a particularly weather-proof vehicle enclosure which may be advantageously readily transported on a transporter.

In a further subsidiary aspect, the enclosure comprises a vehicle exit formed between the deployed modules and one or more closure member capable of selectively closing the vehicle exit. Optionally, one or more closure members may incorporate a roller blind system which is particularly advantageous for transportation within the transportable module for example in a compartment provided in the housing.

In a further broad aspect, embodiments of the invention provide a transportable module which when deployed forms at least part of a vehicle enclosure, the transportable module comprising a first housing which houses at least part of an air handling unit, and a second or additional housing being suitable for housing and fully enclosing a vehicle; whereby spraying and baking operations may be carried out within said additional housing whilst said vehicle is shielded from the surrounding environmental conditions; the air handling unit being configured to heat and/or cool air in order to provide heated or cooled air to the vicinity of the vehicle; and an extraction duct for removing air from the additional housing and for filtering the removed air prior to disposing of it into the surrounding environment; wherein a wall is provided between the air handling unit and the additional housing; the wall closing one end of the additional housing.

In a further broad aspect, embodiments of the invention provide a transportable module which when deployed forms at least part of a vehicle enclosure, the transportable module comprising a first housing which houses at least part of an air handling unit, and an additional housing being suitable for housing and fully enclosing a vehicle; whereby spraying and baking operations may be carried out within the additional housing whilst the vehicle is shielded from the surrounding environmental conditions; the air handling unit being configured to heat and/or cool air in order to provide heated or cooled air to the vicinity of the vehicle; and an extraction duct for removing air from the additional housing and for filtering the removed air prior to disposing of it into the surrounding environment; wherein the first housing is displaceable from a first position where it is located within the additional housing to a second position where it is located partially above or to one side of said additional housing; whereby the usable interior space of said additional housing is expanded.

DETAILED DESCRIPTION OF THE FIGURES

Figure 1:
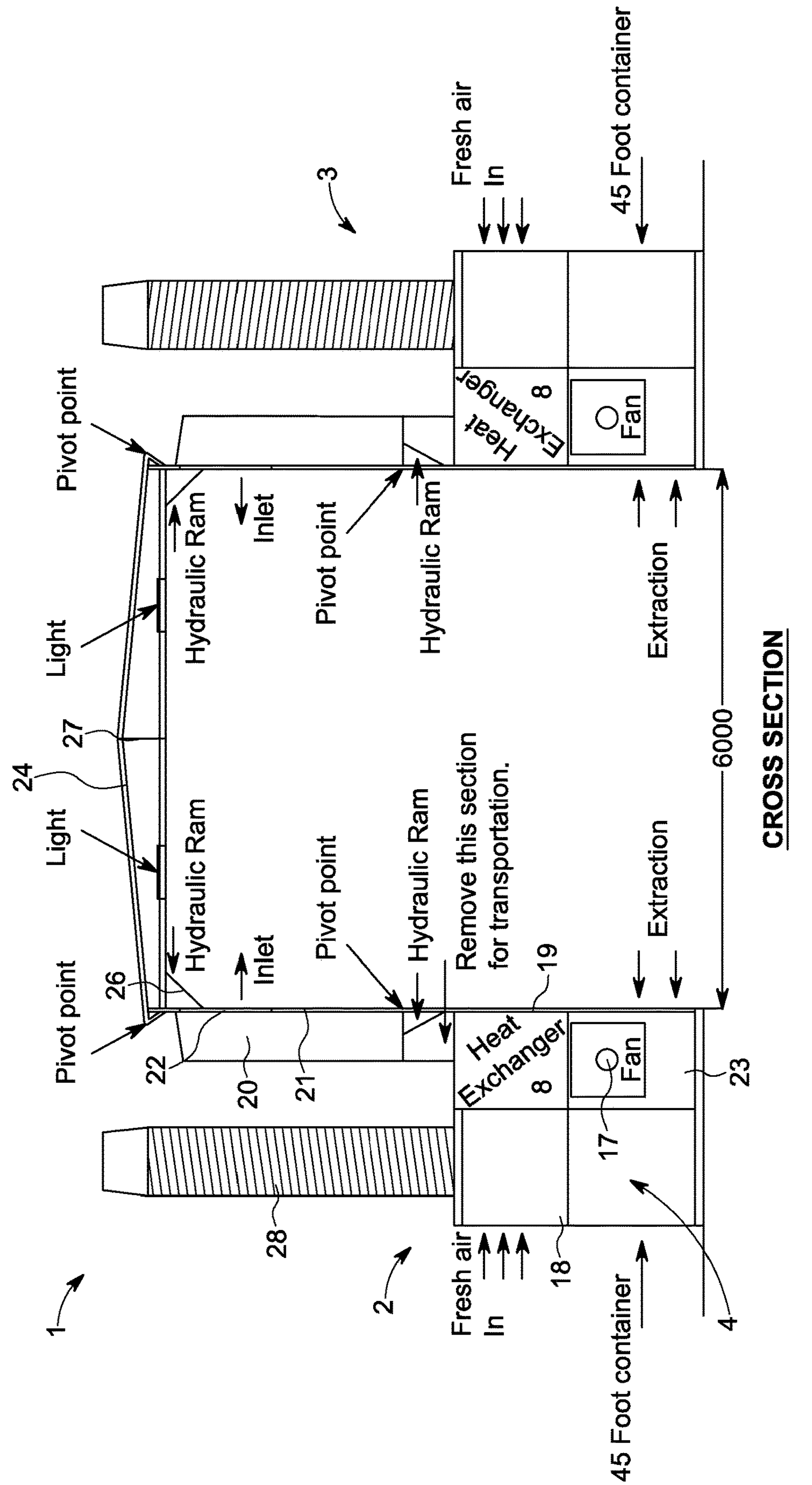
FIG. 1 shows a schematic cross-sectional view of a pair of transportable modules in their deployed configuration as they form a spraying and baking vehicle enclosure.

FIG. 1 generally shows a spraying and baking vehicle enclosure 1, formed by two transportable modules respectively referenced 2 and 3. The transportable modules may be identical. However, in certain embodiments, the modules may differ from one another, for example in certain embodiments it may be envisaged for only one of the modules to incorporate an air handling unit whilst the other accommodates more generous storage facilities.

Figure 2:
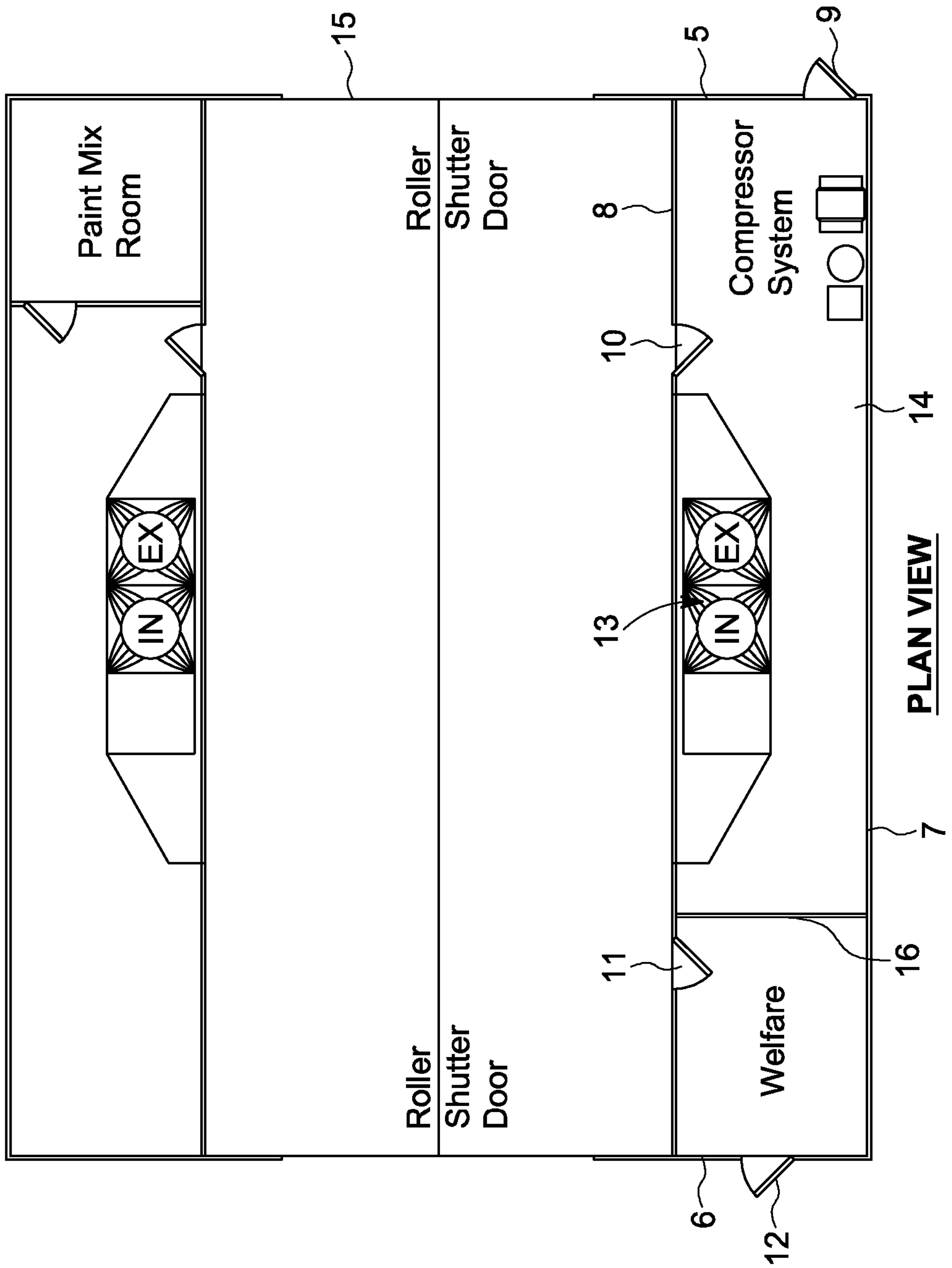
FIG. 2 is a plan view of the spraying and baking vehicle enclosure formed by two adjacent transportable modules.
Figure 3:
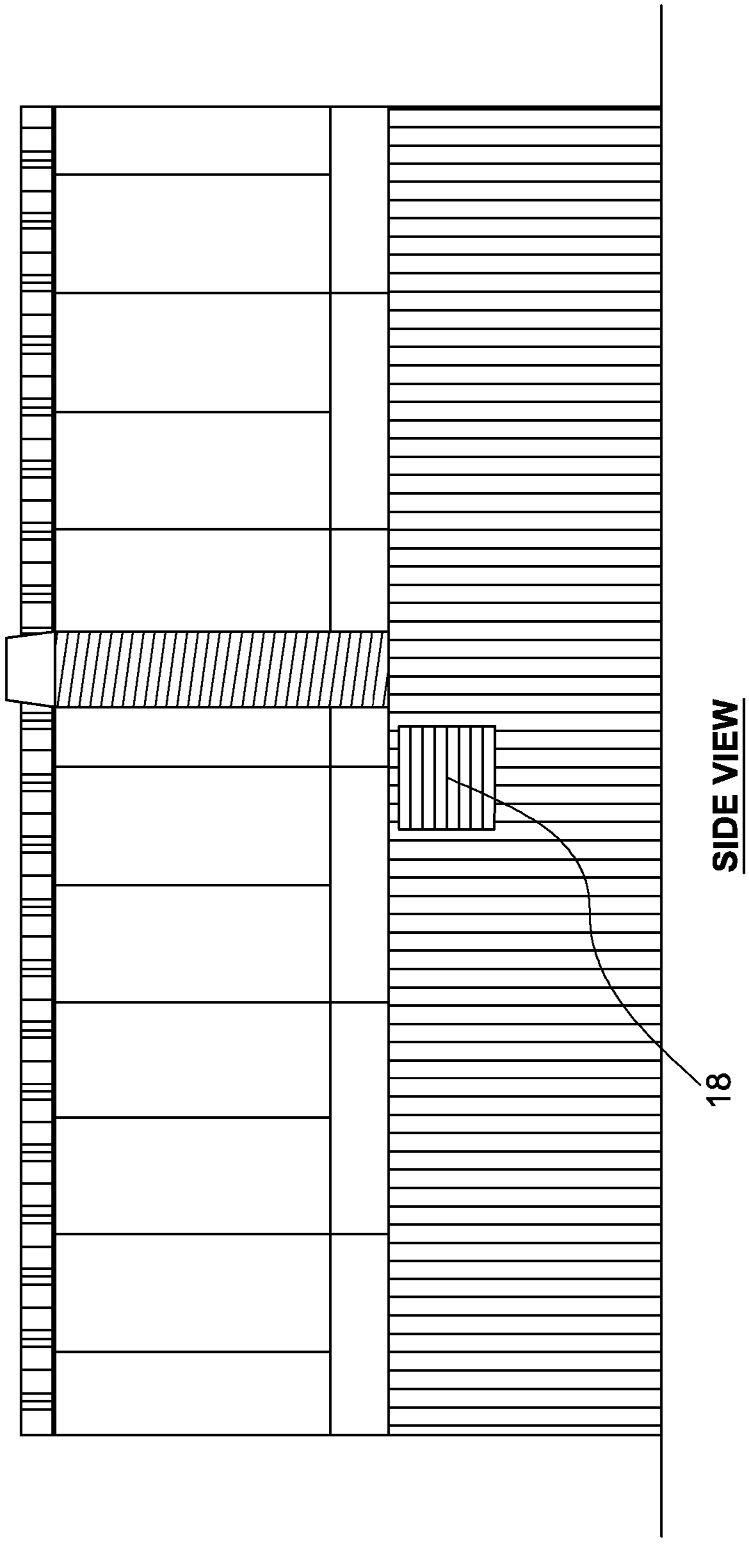
FIG. 3 shows a side elevation of a deployed transportable module when integrated into a spraying and baking vehicle enclosure.

Nevertheless, since in preferred embodiments both modules are identical, the detailed description will be provided with respect to transportable module 2. Transportable module 2 incorporates a housing 4 with a front wall 5 (see FIG. 2), a rear wall 6 located at the opposite extremity of the housing, a first side wall 7 located opposite to a second side wall 8. Walls 5, 6, 7 and 8 are deemed to be external walls. One or more doors may be provided to access the housing. For example, the doors 9, 10, 11 and 12 are provided, which may be simple hinged panels. Within the housing, an air handling unit generally referenced 13 may be provided adjacent to the second side wall 8 and may itself be provided in its own segregated compartment. This allows a space 14 between the air handling unit and the first side wall 7 which may be employed for storage purposes. During transport for example, a roller shutter, such as roller shutter door 15 may be rolled and stowed away in space 14. An internal partition 16 may also be provided to segregate the air handling unit from a welfare area which may be used as an office, toilet and for any other purpose suitable for the application envisaged.

The air handling unit employs a fan 17 which may draw fresh air in through a fresh air duct 18 and through a heat exchanger 19 for heating the air at either a level suitable for a spraying temperature within the enclosure or a baking temperature as appropriate. The heated air may then flow through a duct 20, which may be incorporated into the deployable side wall 21. In the upper portion of the deployable side wall 21, a vent 22 may be provided through which heated air enters the vehicle receiving volume of the enclosure. The air unit comprises an extraction duct 23 located adjacent to the floor of the housing, which causes the air to circulate or flow from upper regions of the vehicle enclosure to the bottom region. Extracted air may then be passed through a number of filters in order to remove contaminants prior to being expelled through a duct or chimney 28. In certain embodiments, the chimney may solely be used for any gaseous emissions produced by the heat exchanger. The heat exchanger 19 may be a direct fired gas burner or any other appropriate kind of heat exchanger. In such embodiments, the heat exchanger may also be equipped with a refrigeration cycle which may be employed to cool the circulated air rather to heat it.

Figure 4:
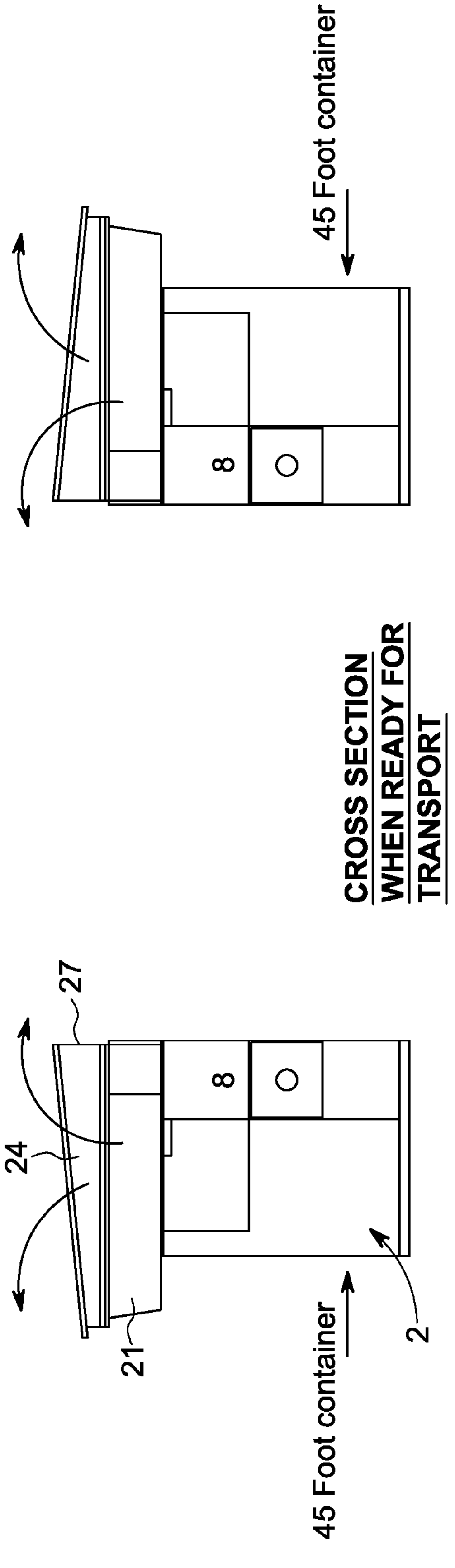
FIG. 4 shows two transportable modules prior to their deployment and in a form which would be loaded onto a transporter.

During transportation the module 2 can carry on the roof of its housing both side wall 20 and roof portion 24. In preferred embodiments, side wall 21 is stacked on top of the housing whilst roof portion 24 is itself stacked on side wall portion 21. In preferred embodiments, side wall portion 21 is pivotally secured to an upper portion of the housing in order to be able to change configuration between the stacked configuration of FIG. 4 and the deployed configuration of FIG. 1. A hinge or pivot point may be provided between the side wall portion and the housing. Similarly, roof portion 24 is pivotally secured to the uppermost extremity of side wall 21 whereby it may be transported in a stacked configuration as shown in FIG. 4 whilst being deployed as projecting laterally as shown in FIG. 1. In practice, the displacement of the stacked side wall 21 and the roof portion 24 may be driven by an actuator. The actuator may take the form of a hydraulic ram such as hydraulic rams 25 and 26. In one embodiment, the side wall 21 is initially pivoted by 90 degrees from the configuration of FIG. 4 to the configuration of FIG. 1 whilst at the same time carrying the stacked roof. Alternatively, the roof portion may be first deployed by rotation from its stacked configuration to an erect position and then the side portion 21 could then be rotated. Embodiments are envisaged to cover either sequence of deployment. Once the side wall and roof portions are in their deployed positions and the extremities abut one another, these may be secured into position by bolting, welding or any other appropriate attachment methodology. Alternatively, the extremities of the roof portion may be designed with appropriate tongue and groove mechanisms to align and interlock once deployed. Once deployed in the configuration of FIG. 1 the roller blinds may be placed in the respective entrance and exit to the enclosure and chimneys 28 may be deployed as appropriate. Whilst not shown in the figures, a floor portion for the vehicle receiving portion may also be deployed. For example, the floor portion may be placed against the inner side wall of the housing and may therefore be deployed by rotation by 90 degrees should a floor portion be required in any particular embodiment.

In a preferred embodiment, the air handling unit may raise the temperature of the incoming air at a temperature which could be as low as −5 degrees Celsius to 22 degrees Celsius to enable a suitable spray temperature to be achieved. The spray temperature is preferably between 15 and 30 degrees Celsius. Similarly, on the bake mode of operation, a temperature in excess of 50 degrees Celsius is envisaged over the entire vehicle containing enclosure to ensure complete curing of 2 pack materials. Preferably, the baking mode operations reaches a temperature between 50 and 75 degrees Celsius. In a preferred embodiment, the temperature reached is of 60 degrees Celsius. These temperatures may also be reached dependent upon the environmental conditions surrounding the enclosure by employing a refrigeration circuit in embodiments where one is provided.

Whilst the primary embodiment shows the combination of two oppositely disposed modules to form the vehicle receiving enclosure, further embodiments envisage a succession of modules of this kind which may be preferably aligned in the longitudinal direction of the enclosures.

Figure 5:
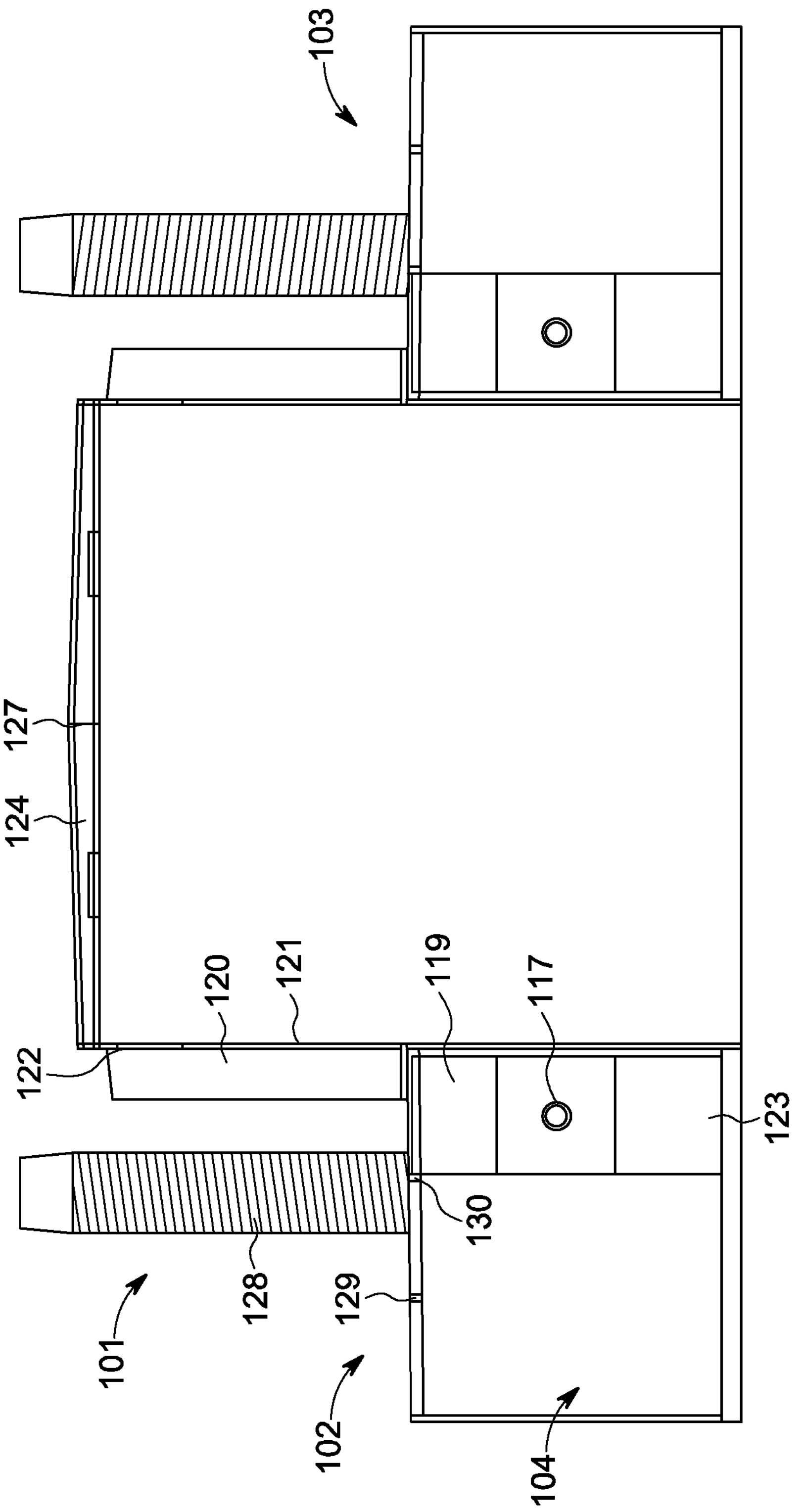
FIG. 5 shows a schematic cross-sectional view of a pair of transportable modules in their deployed configuration as they form a spraying and baking vehicle enclosure in accordance with a further embodiment.

FIG. 5 generally shows a spraying and baking vehicle enclosure 101, formed by two transportable modules respectively referenced 102 and 103. The transportable modules may be identical. However, in certain embodiments, the modules may differ from one another, for example in certain embodiments it may be envisaged for only one of the modules to incorporate an air handling unit whilst the other accommodates more generous storage facilities.

Figure 6:
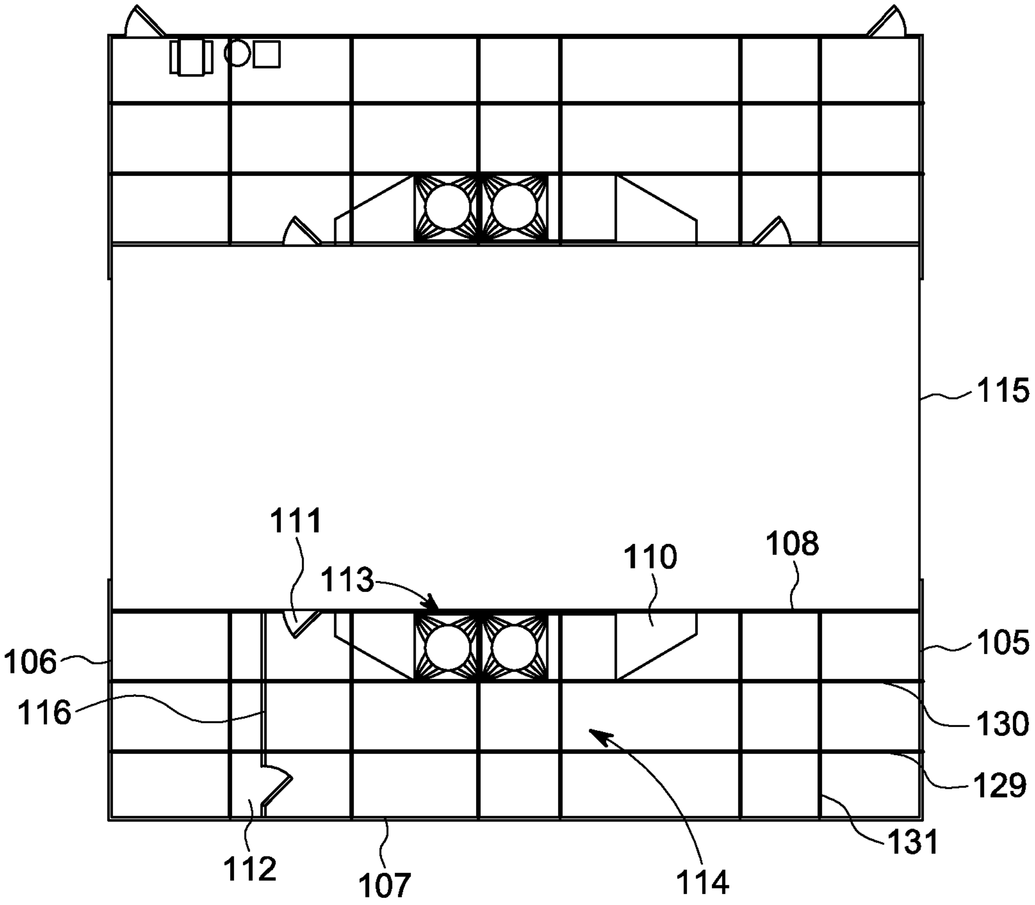
FIG. 6 is a plan view of the spraying and baking vehicle enclosure formed by two adjacent transportable modules in accordance with the embodiment of FIG. 5.
Figure 7:
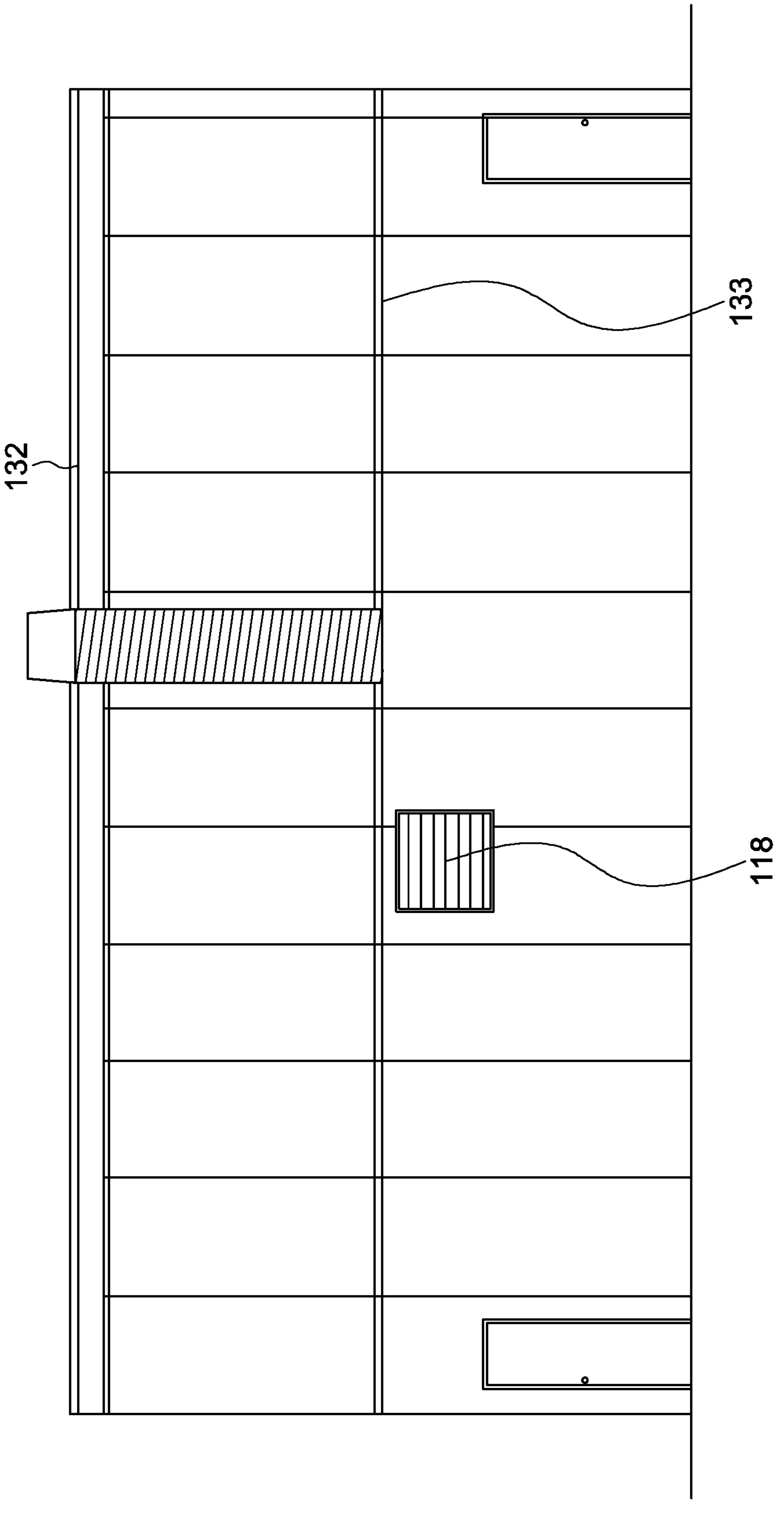
FIG. 7 shows a side elevation of a deployed transportable module when integrated into a spraying and baking vehicle enclosure in accordance with the embodiment of FIG. 5.

Nevertheless, since in preferred embodiments both modules incorporate an air handling unit, the detailed description will be provided with respect to transportable module 102. Transportable module 102 incorporates a housing 104 with a front wall 105 (see FIG. 6), a rear wall 106 located at the opposite extremity of the housing, a first side wall 107 located opposite to a second side wall 108. Walls 105, 106, 107 and 108 are deemed to be external walls. One or more doors may be provided to access the housing. For example, the doors 110, 111 and 112 are provided, which may be simple hinged panels. Within the housing, an air handling unit generally referenced 113 may be provided adjacent to the second side wall 108 and may itself be provided in its own segregated compartment. This allows a space 114 between the air handling unit and the first side wall 107 which may be employed for storage purposes. During transport for example, a roller shutter, such as roller shutter door 115 may be rolled and stowed away in space 114. An internal partition 116 may also be provided to segregate the air handling unit from a welfare area which may be used as an office, toilet and for any other purpose suitable for the application envisaged.

The air handling unit employs a fan 117 (see FIG. 5) which may draw fresh air in through a fresh air duct and through a heat exchanger 119 for heating the air at either a level suitable for a spraying temperature within the enclosure or a baking temperature as appropriate. The heated air may then flow through a duct 120, which may be incorporated into the deployable side wall 121. In the upper portion of the deployable side wall 121, a vent 122 may be provided through which heated air enters the vehicle receiving volume of the enclosure. The air unit comprises an extraction duct 123 located adjacent to the floor of the housing, which causes the air to circulate or flow from upper regions of the vehicle enclosure to the bottom region. Extracted air may then be passed through a number of filters in order to remove contaminants prior to being expelled through a duct or chimney 128. In certain embodiments, the chimney may solely be used for any gaseous emissions produced by the heat exchanger. The heat exchanger 119 may be a direct fired gas burner or any other appropriate kind of heat exchanger. In such embodiments, the heat exchanger may also be equipped with a refrigeration cycle which may be employed to cool the circulated air rather to heat it.

Figure 8:
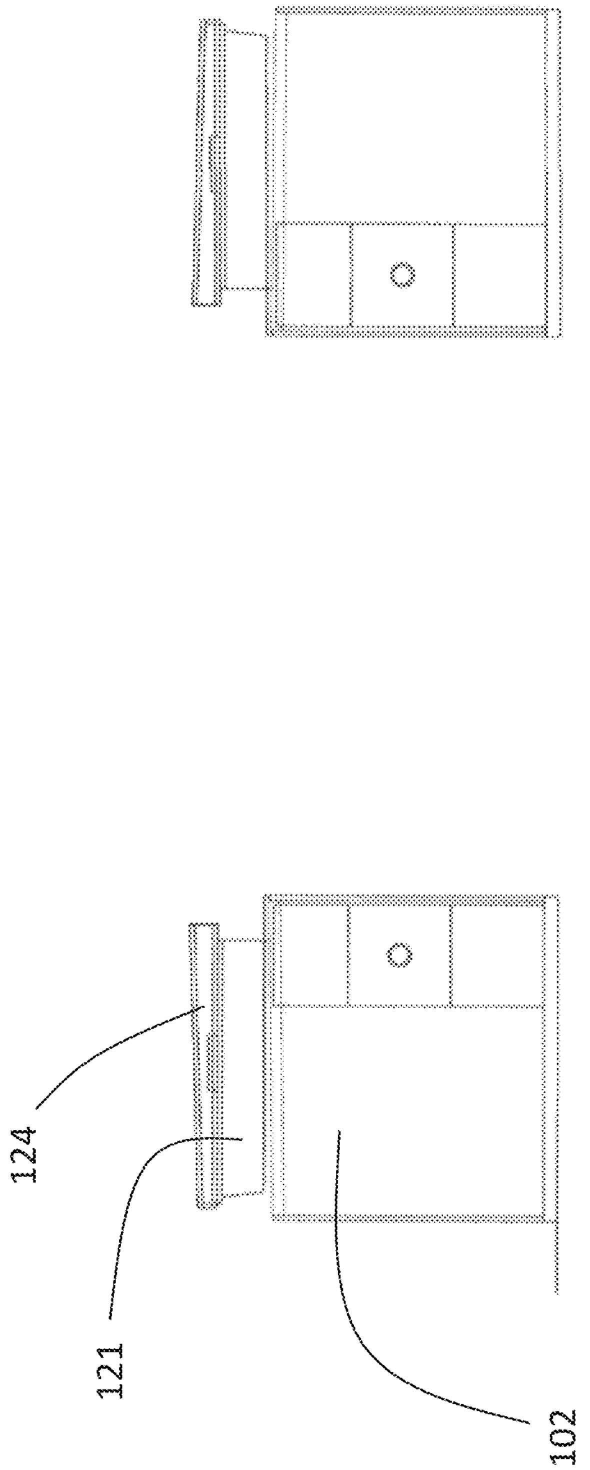
FIG. 8 shows two transportable modules prior to their deployment in accordance with the embodiment of FIG. 5 and in a form which would be loaded onto a transporter.

During transportation, the module 102 can carry on the roof of its housing both side wall 120 and roof portion 124. In preferred embodiments, side wall 121 is stacked on top of the housing whilst roof portion 124 is itself stacked on side wall portion 21. In preferred embodiments, side wall portion 121 is pivotally secured to an upper portion of the housing in order to be able to change configuration between the stacked configuration of FIG. 8 and the deployed configuration of FIG. 5. A hinge or pivot point may be provided between the side wall portion and the housing. Similarly, roof portion 124 is pivotally secured to the uppermost extremity of side wall 121 whereby it may be transported in a stacked configuration as shown in FIG. 8 whilst being deployed as projecting laterally as shown in FIG. 5. In practice, the displacement of the stacked side wall 121 and the roof portion 124 may be driven by an actuator. The actuator may take the form of a hydraulic ram such as hydraulic rams described in previous embodiment. In one embodiment, the side wall 121 is initially pivoted by 90 degrees from the configuration of FIG. 8 to the configuration of FIG. 5 whilst at the same time carrying the stacked roof. Alternatively, the roof portion may be first deployed by rotation from its stacked configuration to an erect position and then the side portion 121 could then be rotated. Embodiments are envisaged to cover either sequence of deployment. Once the side wall and roof portions are in their deployed positions and the extremities abut one another, these may be secured into position by bolting, welding or any other appropriate attachment methodology. Alternatively, the extremities of the roof portion may be designed with appropriate tongue and groove mechanisms to align and interlock once deployed. Once deployed in the configuration of FIG. 5, the roller blinds may be placed in the respective entrance and exit to the enclosure and chimneys 28 may be deployed as appropriate. Whilst not shown in the figures, a floor portion for the vehicle receiving portion may also be deployed. For example, the floor portion may be placed against the inner side wall of the housing and may therefore be deployed by rotation by 90 degrees should a floor portion be required in any particular embodiment. Alternatively, in preferred embodiments, no floor is provided between the modules so that the structure may for example straddle railway tracks or other vehicle carrying structures.

A number of support beams such as longitudinal beams 129 and 130 may be provided as part of the roof of the module 102. In further embodiments, a plurality of cross beams are also provided such as laterally extending beam 131. These are particularly advantageous in carrying the side wall portion 121 and roof portion 124 as shown in FIG. 8. The stacked configuration shown in FIG. 8 doesn't cover the entire surface of the roof. A space is provided around the perimeter of the stack between the perimeter of the stack and the perimeter of the roof of the module 102. This removes the overhang which was considered in the first embodiment. Side walls are also equipped with longitudinal beams such as beams 132 and 133, with vertical beams or with a combination of longitudinal beams and vertical beams (along preferably orthogonal axes). The modules can thus be readily transported and carry during transportation and when fully deployed both the internally provided air handling unit and the stack formed by the side wall portion and the roof portion. In preferred embodiments, a combination of beams in orthogonal directions are provided on each one of the faces of a module including its floor.

In a preferred embodiment, the air handling unit may raise the temperature of the incoming air at a temperature which could be as low as −5 degrees Celsius to 22 degrees Celsius to enable a suitable spray temperature to be achieved. The spray temperature is preferably between 15 and 30 degrees Celsius. Similarly, on the bake mode of operation, a temperature in excess of 50 degrees Celsius is envisaged over the entire vehicle containing enclosure to ensure complete curing of 2 pack materials. Preferably, the baking mode operations reaches a temperature between 50 and 75 degrees Celsius. In a preferred embodiment, the temperature reached is of 60 degrees Celsius. These temperatures may also be reached dependent upon the environmental conditions surrounding the enclosure by employing a refrigeration circuit in embodiments where one is provided.

Whilst the primary embodiment shows the combination of two oppositely disposed modules to form the vehicle receiving enclosure, further embodiments envisage a succession of modules of this kind which may be preferably aligned in the longitudinal direction of the enclosures.

Figure 9:
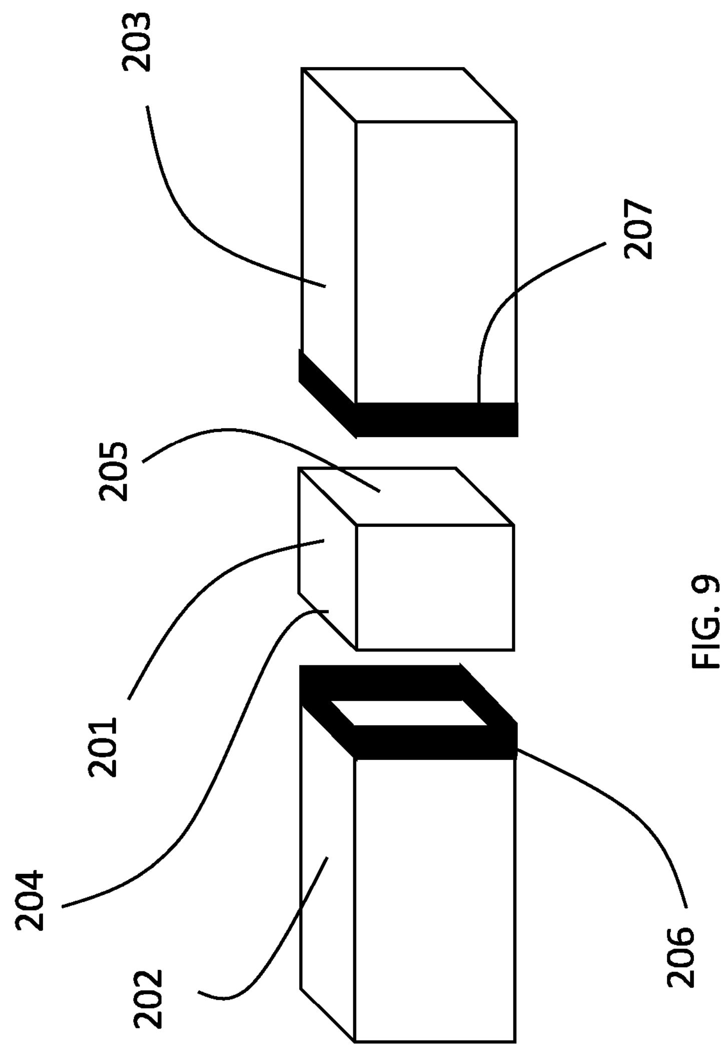
FIG. 9 shows in perspective schematic view an embodiment formed from a plurality of modules with an air handling unit sandwiched between two vehicle enclosures.

FIG. 9 shows a further embodiment where a spray and bake enclosure is formed of at least one transportable module. An air handling module 201 may be provided which is of smaller dimensions than two further modules such as module 202 and 203. Air handling module 201 may comprise 6 faces and be substantially cubic. The air handling module may have two side walls, a roof and a floor and potentially having one or both of the front and/or rear faces open. In one embodiment, both front and rear faces respectively 204 and 205 are open. The side faces, the roof and the floor being relatively rigid in construction in order to be able to carry the air handling unit, which may include an air conditioning unit or a heater in order to cool or heat an adjacent enclosure such as enclosures 202 and 203. A junction member 206 may be provided between the air handling unit and the enclosure 202. A further junction member 207 may be provided between the air handling unit and a further enclosure such as enclosure 203. The junction members may incorporate a frame formed of two upright members and two laterally extending members which combine to provide a robust connection between the air handling unit and adjacent enclosures. One or both adjacent enclosures may be suitable to accommodate a vehicle for spraying and baking. Once assembled the air handling unit, the or each junction members and the vehicle enclosure, these may be suitable for transportation as a single piece. Alternatively, these may be dismantled for transportation in two or more parts.

In one embodiment, the air handling unit is provided centrally and may be configured to heat either of the adjacent vehicle enclosures. The air handling unit may for example be able to recycle the heated air from a first unit into a second adjacent unit in order to allow more rapid temperature rises suitable for baking paint. For example, in a mode of operation, a vehicle may be prepared, and spray painted at a relatively low or near ambient temperature in a first enclosure. Once spraying is completed the air handling unit may be configured to heat the temperature in said first enclosure to a higher temperature in order to facilitate baking of the paint. In the second adjacent enclosure, a vehicle may be prepared and sprayed at relatively low or ambient temperature and thereafter once the baking has been completed in the first enclosure, a pump may force the heated air from the first enclosure into the second enclosure in order to reach a temperature suitable for baking. By so doing, the first vehicle enclosure may also be replenished with fresh air for the painting of a subsequent vehicle whilst the heated air from the first enclosure may serve as the necessary temperature for heating the second enclosure. The air handling unit may incorporate an exhaust system to draw in from either of the adjacent enclosures as appropriate.

In further embodiments, the air handling module may operate in conjunction with 3 or 4 adjacent vehicle modules and a controller may be provided to cause the flow of air from any of the vehicle enclosure to any other one of the vehicle enclosures.

The junction members may include I- or T- beams, box sections, or plates which are either bolted or welded to the frames of the respective adjacent modules.

Figure 10:
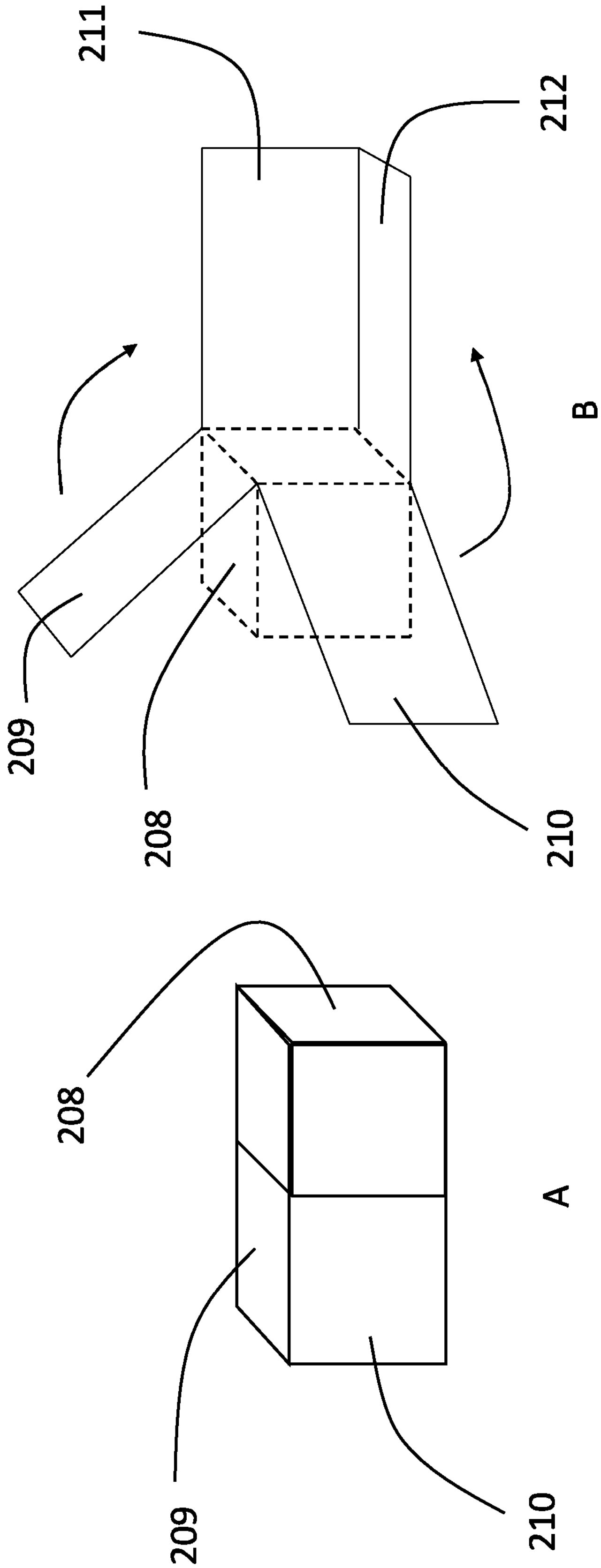
FIG. 10 shows in perspective schematic view an embodiment where the air handling unit module expands into a much larger combined structure of air handling unit and vehicle enclosure.

FIGS. 10A and 10B show an embodiment of a vehicle enclosure which is relatively compact when transported on a transporter as shown in FIG. 10A and may then be expanded to form a combined air handling unit and vehicle enclosure as shown in FIG. 10B. An air handling unit 208 is provided to house a heater or a cooler, and/or any appropriate filtration means which would draw air from an adjacent vehicle enclosure prior to exhausting into the environment in the vicinity of the unit. The air handling unit is secured to one or more deployable side walls such as side walls 209, 210, 211 and 212.

During transportation, side walls 209, 210, 211 and 212 rest against a portion of the air handling unit as shown in FIG. 10A. In the view presented as FIG. 10A, side wall 212 is folded back or located underneath the air handling unit whilst side wall 211 is folded back or located behind the air handling unit—these are therefore not visible in FIG. 10A. The floor or side wall 212 may either slide out from underneath the air handling unit or be folded out. The driver for the displacement of the floor or side wall may be electronic or pneumatic with a ram or other pressure applying actuators. The sidewalls may also be mechanically secured to the air handling unit for displacement between a first position as shown in FIG. 10A and a second position where the unit comprises an air handling unit to one side of a vehicle enclosure. Junction members may be provided to secure the side walls together. Optionally, a roller blind or other closure mechanism may be envisaged to close the vehicle enclosure in its forward most face. Furthermore, whilst the side walls are presented as having a single leaf these may incorporate a number of leaves which are stacked onto one another for transportation and then readily deployed to form the vehicle enclosure. The sidewalls are preferably rigid sidewalls and are sufficient in width to isolate the contents of the enclosure. The sidewalls are preferably load bearing whereby the entire structure once assembled may be lifted up for displacement in the vicinity of its initial deployment or onto a transporter for transportation to a further location.

Figure 11:
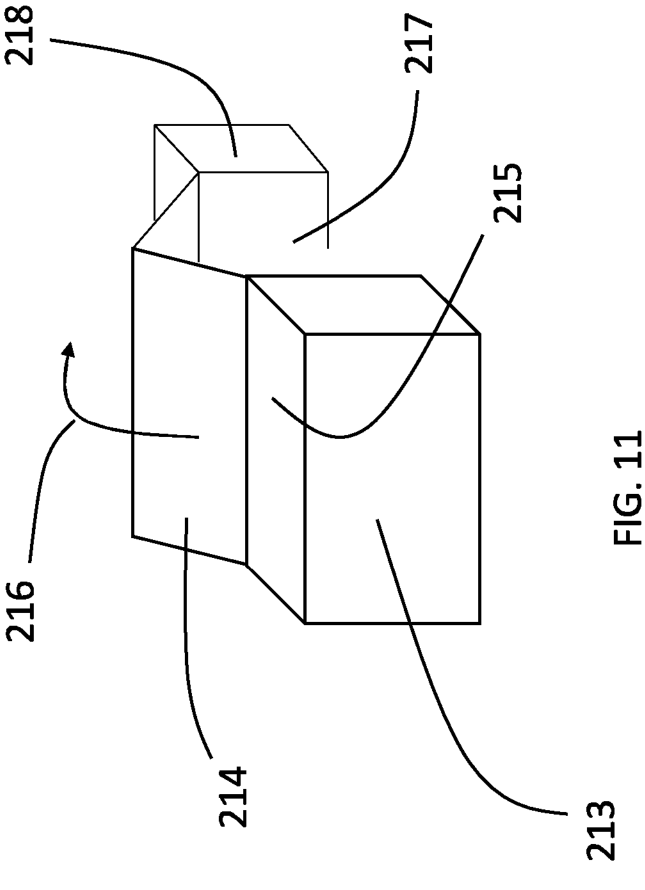
FIG. 11 shows in perspective view a further embodiment comprising an air handling module and a central vehicle receiving portion.

FIG. 11 show a further deployable enclosure where during transportation a first vehicle enclosure 213 is equipped with a number of sidewalls, a floor and a roof onto which one or two leaves of an extended structure may be carried during transportation. For example, roof leaf 214 may rest during transportation on a roof portion 215, whereby the roof leaf may be displaced as shown by arrow 216.

A central vehicle enclosure 217 may be formed as the result of the deployment of roof leaf 214 provided a second additional vehicle enclosure 218 is positioned at a sufficient distance from the first vehicle enclosure 213 in order to accommodate the central vehicle enclosure 217.

In other embodiments, one or both of the cooperating vehicle enclosures may primarily be an air handling unit whilst the central vehicle enclosure is the primary vehicle receiving portion of the assembled structure.

In further embodiments, one of the cooperating vehicle enclosures may be provided with the entirety of the leaves which together form the roof of the central vehicle enclosure. These may be stacked during transportation and then deployed as appropriate. The deployment may either require external displacement means such as a crane or other lifting contraption or be facilitated by integral actuators such as hydraulic rams or motors.

Additional junction members may be provided for securing the leaves of the roof together. In certain embodiments, there may be no floor in the central enclosure whilst in other embodiments a floor may also be formed by one or more leaves of the vehicle enclosures. The floor may for example be formed by the combination of two leaves from each one of the side enclosures.

Figure 12:
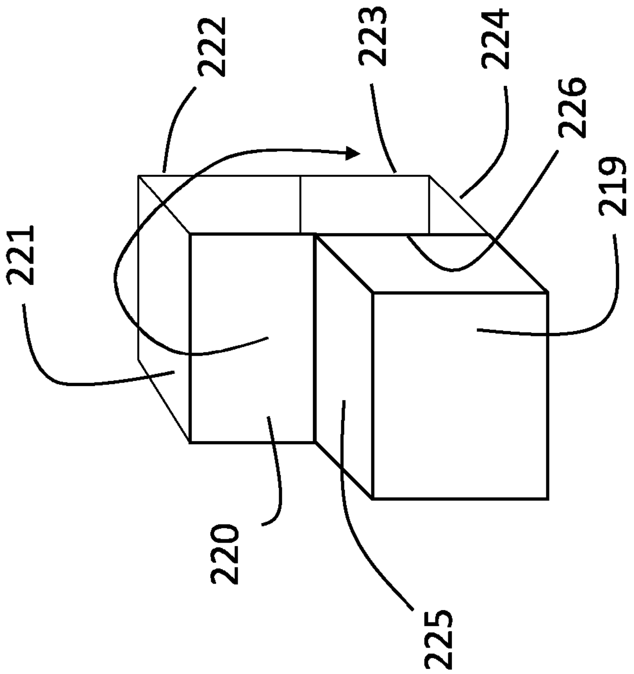
FIG. 12 shows a perspective view of a further embodiment with an expandible air handling module.

FIG. 12 shows a further embodiment of an air handling unit generally referenced 219 from which a succession of 5 leaves is deployed such as leaves 220, 221, 222, 223 and 224. These leaves may be formed as a stack on either or both of the roof 225 or the side wall 226. Junction members may be provided to fix the angles between neighbouring leaves. Junction members may incorporate hinges to provide sufficient flexibility between adjacent leaves. Roller blinds or shutters may be provided on either or both of the front or rear faces of the structure. In this embodiment, the vehicle enclosure is twice as high as the air handling unit from which it is formed. This allows the air handling block to be transported in a particularly compact configuration and deployed into a configuration to accommodate vehicles which are considerably larger than might be expected relative to the size of the air handling unit.

Figure 13:
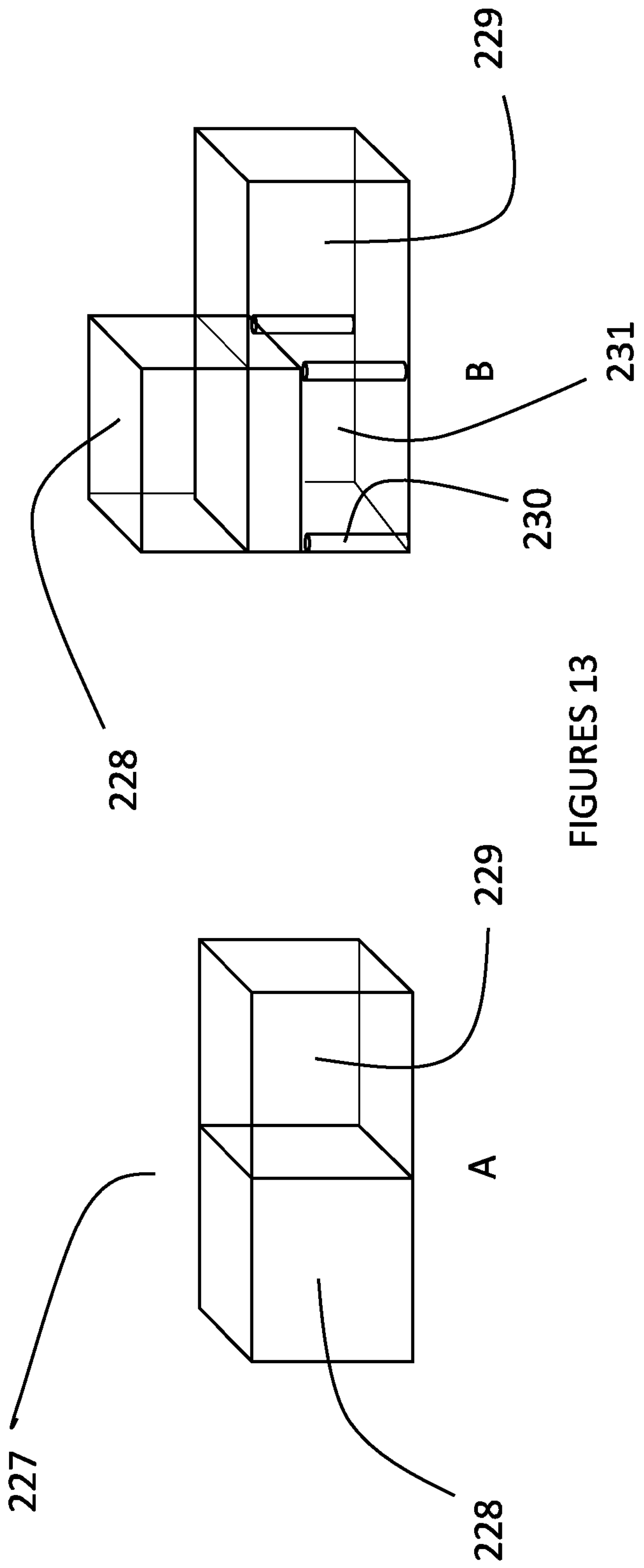
FIG. 13 show perspective views of a unit with an integral air handling unit which displaces to expand the usable internal vehicle receiving space.

The embodiment of FIG. 13 shows a further configuration where during transportation the mono-block comprising a vehicle enclosure and an air handling unit is much more compact than the prior art versions. The mono-block generally referenced 227 is formed of a first portion 228 which contains an air handling unit or block and a second portion 229 which is largely empty and may be suitable for receiving a vehicle or a vehicle part. The block 228 is however displaceable relative to the vehicle enclosure as illustrated in FIG. 13B, whereby the air handling unit may be partially located above a vehicle containing portion. The air handling unit may be lifted up through pneumatic rams such as ram 230, a motor or may simply be secured to the frame of the enclosure in an elevated position; whereby the portion 231 beneath the air handling block is provided to allow a vehicle or part of a vehicle to be housed therein.

It also allows the extraction of air to be in the roof of the enclosure whilst still allowing for a particularly compact structure during transportation.

Figure 14:
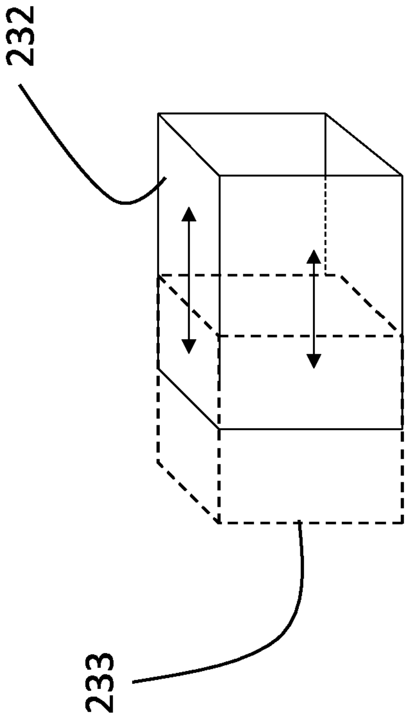
FIG. 14 shows a perspective view of an expandible vehicle enclosure where the air handling unit displaces inside a tube-like housing.

FIG. 14 shows a tube-like vehicle enclosure 232 with two side walls, a roof and a floor portion. Located within (or partly with as shown) the walls of the vehicle enclosure, there is provided an air handling unit 233 which is displaceable with the tube-like vehicle enclosure; whereby for transportation the overall size of the module is considerably reduce and on arrival it is suitable for displacement within the tube in order to extend its dimensions and thereafter readily accept vehicles in the housing formed between the portion vacated by the air handling unit and the rest of the vehicle enclosure. Rails or other conveying means may be provided between the tube-like vehicle enclosure and the air handling unit. The displacement of the air handling unit may be through actuation or through the application of a force by external means of known kind.

The invention claimed is:

1. A transportable module which when deployed forms at least part of a vehicle enclosure, said transportable module comprising a first housing with a roof portion, a floor portion, a first side wall portion, a second side wall portion, a third side wall portion and a fourth side wall portion, said first housing houses at least part of an air handling unit, said first housing comprising a rigid side wall portion which is extendible to form at least part of an additional housing adjacent to said air handling unit; said additional housing being suitable for housing and fully enclosing a vehicle; whereby spraying and baking operations may be carried out within said additional housing whilst said vehicle is shielded from the surrounding environmental conditions; said air handling unit being configured to heat and/or cool air in order to provide heated or cooled air to the vicinity of said vehicle; and an extraction duct for removing air from said additional housing and for filtering said removed air prior to disposing of it into the surrounding environment; and an actuator for driving the deployment of said rigid side wall portion, wherein said rigid side wall portion is stackable adjacent to said first housing during transportation and which is deployable to project upwards from said first housing; and said roof portion is also stackable with respect to said first housing during transportation and which is deployable to form a roof whilst resting on at least part of said side wall portion.

2. The transportable module according to claim 1, wherein at least one of said first side wall portion, second side wall portion, third side wall portion, fourth side wall portion and said rigid side wall portion incorporates at least one air duct through which air flows from said air handling unit to an inlet through which heated air enters a vehicle receiving portion when an enclosure is formed in part by said deployed module.

3. The transportable module according to claim 1, wherein said first housing comprises an extraction duct through which air in an enclosure formed in part by said deployed module may be drawn out of said vehicle receiving portion of said enclosure.

4. The transportable module according to claim 1, wherein said first housing comprises a fan for driving the circulation of air through the air handling unit and a vehicle receiving portion in said additional housing when an enclosure is formed in part by said deployed module.

5. The transportable module according to claim 1, wherein said first housing comprises a burner for heating air at a first temperature level suitable for spraying paint onto a vehicle and at a second temperature level suitable for baking said paint.

6. The transportable module according to claim 1, wherein said air handling unit comprises a heat exchanger for cooling air to a temperature suitable for spraying paint onto a vehicle.

7. The transportable module according to claim 1, wherein said first side wall portion is located towards the front of said first housing, said second side wall portion is located to one side of said first housing, said third side wall portion is located towards the rear of said first housing and said fourth side wall portion is located to one side of said first housing; said deployable rigid side wall portion being provided above said second side wall portion.

8. The transportable module according to claim 7, wherein said air handling unit is adjacent to said second side wall portion.

9. The transportable module according to claim 7, wherein said air handling unit is provided above said floor portion; said floor portion being configured to carry said air handling unit.

10. The transportable module according to claim 1, wherein said side wall portions, said roof portion and said floor portion each include a plurality of structural beams extending in respective orthogonal axes; said air handling unit being provided within said first housing.

11. The transportable module according to claim 1, wherein said first housing comprises at least one separate rooms in addition to any room within which said air handling unit is located.

12. A transportable module which when deployed forms at least part of a vehicle enclosure, said transportable module comprising a first housing with a roof portion, a floor portion, a first side wall portion, a second side wall portion, a third side wall portion and a fourth side wall portion, said first housing houses at least part of an air handling unit, said first housing comprising a rigid side wall portion which is extendible to form at least part of an additional housing adjacent to said air handling unit; said additional housing being suitable for housing and fully enclosing a vehicle; whereby spraying and baking operations may be carried out within said additional housing whilst said vehicle is shielded from the surrounding environmental conditions; said air handling unit being configured to heat and/or cool air in order to provide heated or cooled air to the vicinity of said vehicle; and an extraction duct for removing air from said additional housing and for filtering said removed air prior to disposing of it into the surrounding environment; and an actuator for driving the deployment of said rigid side wall portion, wherein said rigid side wall portion is stacked above said first housing and is pivotally secured to said first housing.

13. A transportable module which when deployed forms at least part of a vehicle enclosure, said transportable module comprising a first housing with a roof portion, a floor portion, a first side wall portion, a second side wall portion, a third side wall portion and a fourth side wall portion, said first housing houses at least part of an air handling unit, said first housing comprising a rigid side wall portion which is extendible to form at least part of an additional housing adjacent to said air handling unit; said additional housing being suitable for housing and fully enclosing a vehicle; whereby spraying and baking operations may be carried out within said additional housing whilst said vehicle is shielded from the surrounding environmental conditions; said air handling unit being configured to heat and/or cool air in order to provide heated or cooled air to the vicinity of said vehicle; and an extraction duct for removing air from said additional housing and for filtering said removed air prior to disposing of it into the surrounding environment; and an actuator for driving the deployment of said rigid side wall portion, wherein said roof portion is stacked above said rigid side wall portion and is pivotally secured to said rigid side wall portion.

14. A transportable module which when deployed forms at least part of a vehicle enclosure, said transportable module comprising a first housing with a roof portion, a floor portion, a first side wall portion, a second side wall portion, a third side wall portion and a fourth side wall portion, said first housing houses at least part of an air handling unit, said first housing comprising a rigid side wall portion which is extendible to form at least part of an additional housing adjacent to said air handling unit; said additional housing being suitable for housing and fully enclosing a vehicle; whereby spraying and baking operations may be carried out within said additional housing whilst said vehicle is shielded from the surrounding environmental conditions; said air handling unit being configured to heat and/or cool air in order to provide heated or cooled air to the vicinity of said vehicle; and an extraction duct for removing air from said additional housing and for filtering said removed air prior to disposing of it into the surrounding environment; and an actuator for driving the deployment of said rigid side wall portion, wherein said actuator comprises a hydraulic ram extending between said first housing and said side wall portion which when activated causes said side wall portion to pivot from a position where the rigid side wall portion lays substantially flat on top of said first housing to an erect position where the rigid side wall portion extends upwards from said first housing.

15. A transportable module, which when deployed forms at least part of a vehicle enclosure, said transportable module comprising a first housing with a roof portion, a floor portion, a first side wall portion, a second side wall portion, a third side wall portion, and a fourth side wall portion, said housing houses at least part of an air handling unit, said first housing comprising a rigid roof portion which is extendible to form at least part of an additional housing adjacent to said air handling unit; said additional housing being suitable for housing and fully enclosing a vehicle; whereby spraying and baking operations may be carried out within said additional housing whilst said vehicle is shielded from the surrounding environmental conditions; said air handling unit being configured to heat and/or cool air in order to provide heated or cooled air to the vicinity of said vehicle; and an extraction duct for removing air from said additional housing and for filtering said removed air prior to disposing of it into the surrounding environment; said module comprising an actuator for driving the deployment of said rigid roof portion, further comprising a rigid side wall portion and wherein said actuator comprises a hydraulic ram extending between said rigid side wall portion and said rigid roof portion which when activated causes said rigid roof portion to pivot from a position where it lies against said rigid side wall portion to a position where it extends laterally therefrom.

* * * * *